United States Patent
Ito et al.

(10) Patent No.: US 8,336,914 B2
(45) Date of Patent: Dec. 25, 2012

(54) SEATBELT DEVICE OF VEHICLE

(75) Inventors: Akira Ito, Hiroshima (JP); Hidetoshi Iwatani, Hiroshima (JP)

(73) Assignee: Mazda Motor Corporation (JP)

( * ) Notice: Subject to any disclaimer, the term of this patent is extended or adjusted under 35 U.S.C. 154(b) by 258 days.

(21) Appl. No.: 12/637,090

(22) Filed: Dec. 14, 2009

(65) Prior Publication Data

US 2010/0194089 A1 Aug. 5, 2010

(30) Foreign Application Priority Data

Feb. 3, 2009 (JP) ................................. 2009-022811

(51) Int. Cl.
 *B60R 22/04* (2006.01)
 *B60R 22/18* (2006.01)
 *B60R 22/24* (2006.01)

(52) U.S. Cl. .................................... 280/801.1; 280/803

(58) Field of Classification Search ............... 280/801.1, 280/803; 296/146.8
See application file for complete search history.

(56) References Cited

U.S. PATENT DOCUMENTS

| | | | | |
|---|---|---|---|---|
| 4,506,912 A | * | 3/1985 | Ahad | 280/803 |
| 4,741,555 A | * | 5/1988 | Frantom et al. | 280/804 |
| 4,795,189 A | * | 1/1989 | Vollmer et al. | 280/801.1 |
| 4,796,916 A | * | 1/1989 | Rogers et al. | 280/803 |
| 5,044,459 A | * | 9/1991 | Nishikaji | 180/268 |
| 5,647,611 A | * | 7/1997 | Boyd et al. | 280/801.1 |
| 6,336,662 B1 | * | 1/2002 | Kurita et al. | 280/801.1 |
| 6,854,766 B2 | * | 2/2005 | Kobayashi | 280/801.1 |
| 6,971,677 B2 | * | 12/2005 | Niimi | 280/801.1 |
| 7,073,823 B2 | * | 7/2006 | Morino et al. | 280/801.1 |
| 7,328,918 B2 | * | 2/2008 | Hirotani | 280/803 |
| 7,377,550 B2 | * | 5/2008 | Lee | 280/803 |
| 7,819,429 B2 | * | 10/2010 | Amano | 280/801.1 |
| 7,862,086 B2 | * | 1/2011 | Gomi et al. | 280/801.1 |

FOREIGN PATENT DOCUMENTS

| | | | |
|---|---|---|---|
| DE | 10 2008 039 139 A1 | | 2/2009 |
| EP | 0 640 509 A1 | | 3/1995 |
| EP | 0769432 | * | 4/1997 |
| FR | 2 701 906 A1 | | 9/1994 |
| JP | 63-70461 A | | 3/1988 |
| JP | 63-70461 | | 5/1988 |
| JP | 11-198756 | * | 7/1999 |
| JP | 11-240415 | | 9/1999 |
| JP | 11-240415 A | | 9/1999 |
| JP | 2000-95061 | * | 4/2000 |
| JP | 2010-159000 | * | 7/2010 |

OTHER PUBLICATIONS

Extended European Search Report dated May 19, 2010; Application No. 10000822.6-1523.

* cited by examiner

*Primary Examiner* — Ruth Ilan
*Assistant Examiner* — George Spisich
(74) *Attorney, Agent, or Firm* — Studebaker & Brackett PC; Donald R. Studebaker (57) ABSTRACT

A belt anchor comprises an anchor portion which changes the extending direction of a belt body toward a vehicle front, a bolt which supports the anchor portion, and a nut which fastens the bolt. The belt anchor is fixed to a lift gate inner and a second reinforcement at a position which is located near a pivotal axis of a hinge. Accordingly, a seatbelt device of a vehicle which can ensure both the properly-large slant angle of the belt body and the support strength of the belt anchor, keeping appropriate flexibility of the vehicle layout, can be provided.

5 Claims, 7 Drawing Sheets

SEATBELT DEVICE OF VEHICLE

BACKGROUND OF THE INVENTION

The present invention relates to a seatbelt device of a vehicle.

Conventionally, a rear seat for three passengers which is arranged in back of a driver's seat and has a center seat at its central portion is known.

A seatbelt device which can restrain the seated passenger to protect the passenger's protection against a vehicle crash impact is provided for each seat. In these days, it is legally required to provide the seatbelt device for passengers who are seated in the rear seat as well. Herein, a so-called three-point type of seatbelt is preferably applied to the above-described center seat of the rear seat from the safety viewpoints.

In this three-point type of seatbelt for the center seat of the rear seat, a belt body which is withdrawn from a retractor extends through a belt anchor which is arranged at a vehicle upper position, a tongue for anchor which is arranged at a tip of the belt body is operated so as to engage with a buckle for anchor which is arranged on one side of the seat, and a tongue for passenger restraint which is arranged so as to move along the belt body is operated so as to engage with a buckle for passenger restraint which is arranged on the other side of the seat. Thus, the seated passenger can be properly restrained by the three-point type of seatbelt.

Herein, the above-described rear seat has also both-sides seats for two passengers to be seated on both sides of the center seat. Accordingly, a retractor of the seatbelt device for the center seat may not be arranged inside a pillar of the vehicle, unlike the seatbelt device for the both-side seats. Thus, there may be a question of where the seatbelt device including the retractor for the center seat should be arranged. While the seat structure in which the seatbelt device is arranged at the seat itself has been proposed, this may require a design change and also cause a new problem in that the total weight and manufacturing costs of the seat would increase for necessary measures against the crash impact load.

Japanese Patent Laid-Open Publication No. 11-240415 proposes the structure in which the belt body withdrawn from the retractor which is arranged at the lift gate extends through the belt anchor which is arranged at the upper portion of the seatback, i.e., a so-called shoulder portion of the seat, the tongue for anchor which is arranged at the tip of the belt body is operated so as to engage with the buckle for anchor which is arranged on one side of the seat, and the tongue for passenger restraint which is arranged so as to move along the belt body is operated so as to engage with the buckle for passenger restraint which is arranged on the other side of the seat. According to the structure of this publication, it can be prevented that a large load acts on a connecting portion of the seatback and the seat cushion, and the support strength of the retractor can be increased.

Japanese Utility Model Laid-Open Publication No. 63-70461 proposes the structure in which the hinge reinforcement which is provided at the rear header at the rear edge portion of the vehicle roof supports the belt anchor for the rear seat. According to the structure of this publication, the three-point type of seatbelt for the center seat of the rear seat can be provided without any improper design change of the seat.

Meanwhile, in order to absorb the crash impact properly, the slant angle of the seatbelt between the belt anchor and the passenger's shoulder contact portion relative to the vertical direction, when viewed from the vehicle side, may be necessary to be large enough to protect the passenger properly. Then, in order to ensure this slant angle, it may be required that the belt anchor having the large support strength be arranged at a position which is located in back of the passenger, or the seatbelt device itself which comprises the belt anchor and the retractor be arranged at a position which is located in back of the passenger.

According to the structure of the above-described former publication, since the retractor is arranged at the lift gate, the seatbelt device can absorb the crash impact properly without any improper influence to the support strength of the belt anchor arranged at the shoulder portion of the seatback. However, since the retractor is arranged at the lift gate, the belt body extends from the retractor arranged at the lift gate to the seat equipped with the belt anchor arranged thereat when the seatbelt is applied. Accordingly, there is a problem in that the baggage space would not be used properly.

Considering the above-described problem, it may be considered that the retractor is arranged at the roof or the like so that it can be located at a position in front of the rear seat. In this case, however, it may be required that the support strength of the belt anchor arranged at the upper portion of the seatback be increased so that the crash impact can be properly absorbed, and the structure change of the seat itself, including reinforcing the connecting portion between the seatback and the seat cushion and the support strength of the belt anchor itself, may be necessary.

Figure 15:
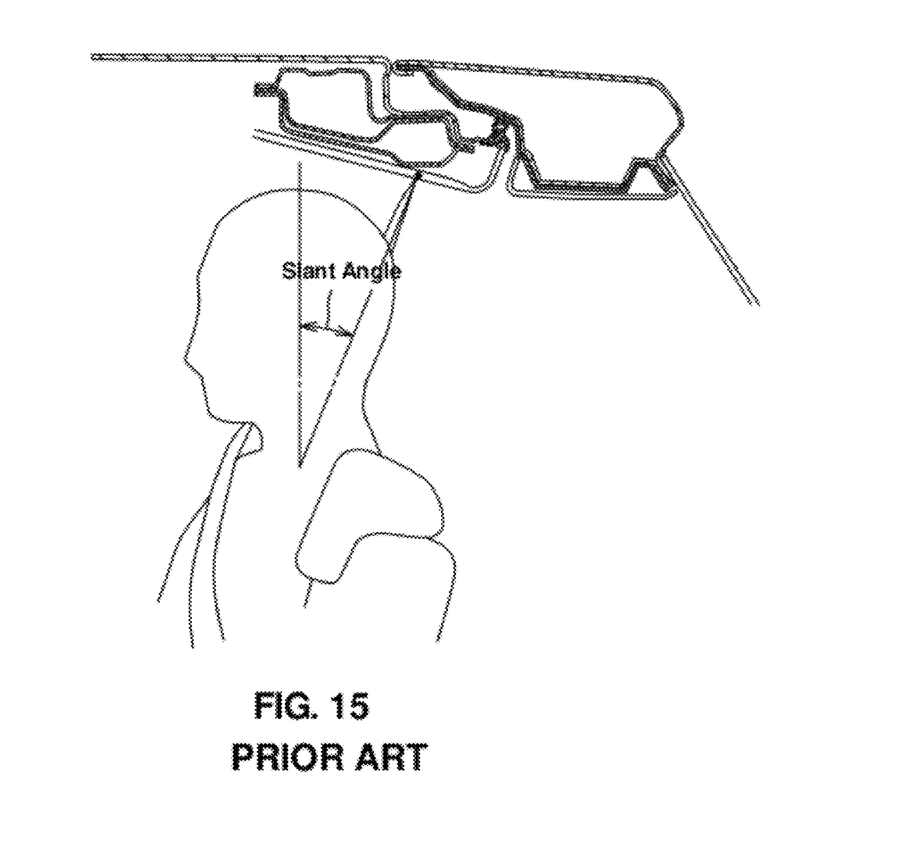
FIG. 15 is a diagram explaining a conventional problem.

Meanwhile, the structure with the belt anchor arranged at the rear header at the rear edge portion of the vehicle roof in the above-described latter publication may be effective in reinforcing the support strength of the belt anchor regardless of the position of the retractor. In this case, however, if the vehicle's rear face is designed to be considerably inclined from vehicle's design requirements, the rear header may be positioned just above the seatback, so that there is a case in which the properly large slant angle could not be ensured even in case of the belt anchor being arranged at the rear header (see FIG. 15).

SUMMARY OF THE INVENTION

An object of the present invention is to provide a seatbelt device of a vehicle which can ensure both the properly-large slant angle of the belt body and the support strength of the belt anchor, keeping appropriate flexibility of the vehicle layout.

According to the present invention, there is provided a seatbelt device of a vehicle which comprises a rear header provided at a rear edge portion of a roof, a rear seat arranged near the rear header, and a lift gate arranged in back of the rear seat, comprising a belt body to restrain a passenger seated in the rear seat, a retractor to store the belt body, and a belt anchor to change an extending direction of the belt body which is withdrawn from the retractor toward a vehicle front, wherein the belt anchor is arranged at the lift gate.

According to the present invention, the seatbelt device of a vehicle which can ensure both the properly-large slant angle of the belt body and the support strength of the belt anchor, keeping appropriate flexibility of the vehicle layout can be provided. That is, since the belt anchor is arranged at the lift gate which is a vehicle constituting member located at the vehicle rear end, the support of the belt anchor can be properly firm. Further, the slant angle between the belt anchor and the passenger's shoulder contact portion relative to the vertical direction, when viewed from the vehicle side, can be properly large enough to protect the passenger properly, regardless of the positions of the retractor and the rear seat. Accordingly, the seatbelt device can absorb the crash impact properly.

According to an embodiment of the present invention, the retractor is provided at the roof. Thereby, the seatbelt device which can ensure the properly-large slant angle with the anchor point located in back of the passenger can be provided even in case the retractor is not arranged at the lift gate.

According to another embodiment of the present invention, the belt anchor is arranged at a position of the lift gate which is located above a rear window fixed to the lift gate. Thereby, the belt body from the retractor to the belt anchor can be made extend along the roof, thereby providing the passenger with a proper rear view.

According to another embodiment of the present invention, the retractor is provided at the lift gate. Thereby, the seatbelt device which can ensure the properly-large slant angle with the anchor point located in back of the passenger can be provided even in case the retractor is not arranged at the roof. Further, the head clearance of the passenger can be ensured, thereby providing the passenger with the appropriate sitting position.

According to another embodiment of the present invention, the vehicle further comprises a hinge which is provided at the rear header to pivotally support the lift gate and a reinforcing member which reinforces an attaching portion of the hinge to the lift gate, and the retractor is fixed to the reinforcing member. Thereby, since the retractor is fixed to the reinforcing member at the attaching portion of the hinge to the lift gate, the support strength of the retractor can be increased without increasing the number of parts.

According to another embodiment of the present invention, the vehicle further comprises a hinge which is provided at the rear header to pivotally support the lift gate, and the belt anchor is arranged near a pivotal axis of the hinge in a vehicle longitudinal direction. Thereby, the passenger can be restrained properly from having an uncomfortable feeling like being pulled by the belt body when the lift gate is opened.

According to another embodiment of the present invention, the belt anchor has a moving means for moving the belt anchor in a vehicle width direction in accordance with an opening-closing move of the lift gate. Thereby, the passenger can be restrained properly from having an uncomfortable feeling like being pulled by the belt body when the lift gate is opened.

According to another embodiment of the present invention, the rear seat has a center seat at a central portion thereof so as to have plural passengers seated therein, and the belt body is provided so as to restrain the passenger seated in the center seat of the rear seat. Thereby, the proper seatbelt device for the passenger seated in the center seat of the rear seat can be provided.

According to another embodiment of the present invention, the belt body comprises a tongue for anchor which is arranged at a tip thereof and a tongue for passenger restraint which is arranged so as to move along the belt body, and there are provided a buckle for passenger restraint which is arranged on one side of the passenger seated so as to engage with the tongue for passenger restraint and a buckle for anchor which is arranged on the other side of the passenger seated so as to engage with the tongue for anchor. Thereby, the three-point type of seatbelt device which can properly restrain the passenger can be provided.

Other features, aspects, and advantages of the present invention will become apparent from the following description which refers to the accompanying drawings.

DETAILED DESCRIPTION OF THE INVENTION

Hereinafter, preferred embodiments of the present invention will be described.

Embodiment 1

Figure 1:
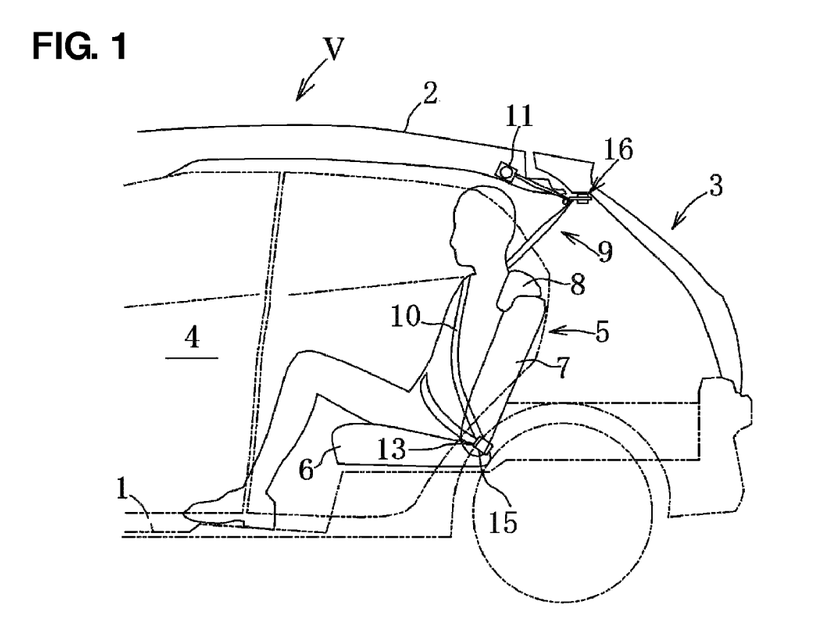
FIG. 1 is a side view of a vehicle showing a first embodiment of the present invention.
Figure 2:
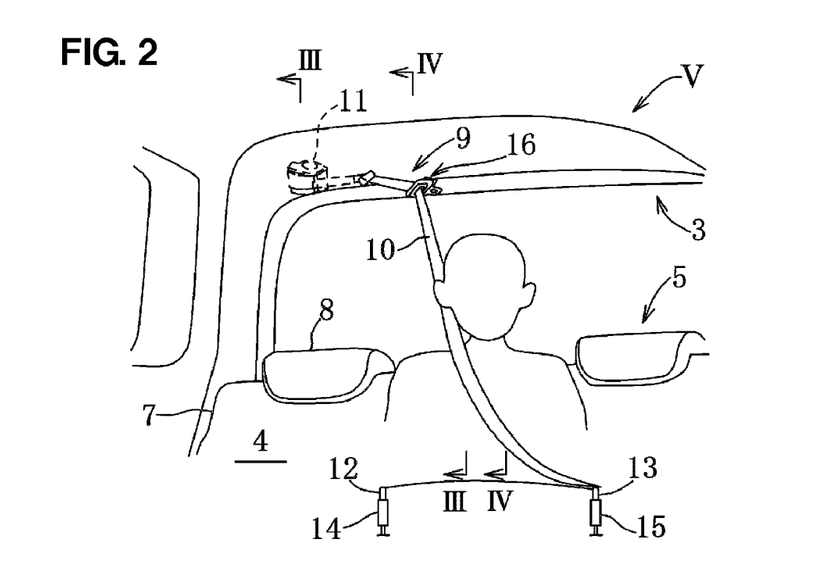
FIG. 2 is an elevation view of FIG. 1.

As shown in FIGS. 1 and 2, a vehicle V is a minivan type of vehicle and has a vehicle compartment 4 which is formed by a floor panel 1, a roof 2, a lift gate 3, and right and left side frames and side doors, not illustrated. A seat 5 (rear seat) which is arranged on the floor panel 1 is disposed in back of a front-row seat which comprises a driver's seat and a passenger's seat, not illustrated, and constitutes a rearmost-row seat in the vehicle compartment 4.

The seat 5 comprises a seat cushion 6, a seatback 7, and a headrest 8 which is detachably attached to the seatback 7. This seat 5 is a bench type of seat which comprises three seats, i.e., a center seat, a left seat and a right seat, for three passengers to be seated.

The seat cushion 6 is attached to the floor panel 1 via a bracket, not illustrated, and configured to slide longitudinally. The seatback 7 is foldable on the seat cushion 6 so as to take its substantially-horizontal folding position on the seat cushion 6. A back face of the seatback 7 is so flat that a substantially-horizontal face on which any baggage is placed can be formed by the back face of the seatback 7.

A seatbelt device 9 for the passenger seated in the center seat of the seat 5 is a three-point type of seatbelt deice which comprises a belt body 10 which restrains the passenger seated, a retractor 11 which stores the belt body 10 therein in such a manner the retractor 11 winds up the belt body 10 or the belt body 10 is withdrawn from the retractor 11, a first tongue 12 (tongue for anchor) which is arranged at a tip of the belt body 10, a second tongue 13 (tongue for passenger restraint) which is arranged so as to move (slide) along the belt body 10, a first buckle 14 (buckle for anchor) which is fixed on the right side of the passenger so as to engage with the first tongue 12, a second buckle 15 (buckle for passenger restraint) which is fixed on the left side of the passenger so as to engage with the second tongue 12, and a belt anchor 16 which changes an extending direction of the belt body 10 which is withdrawn from the retractor 11 arranged at the lift gate 3 toward a vehicle front.

Figure 3:
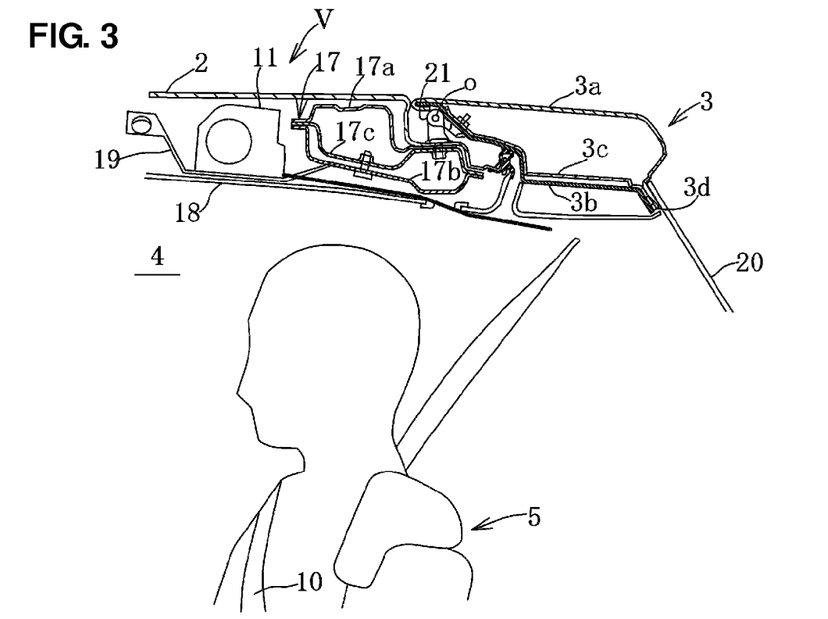
FIG. 3 is a sectional view taken along line III-III of FIG. 2.
Figure 4:
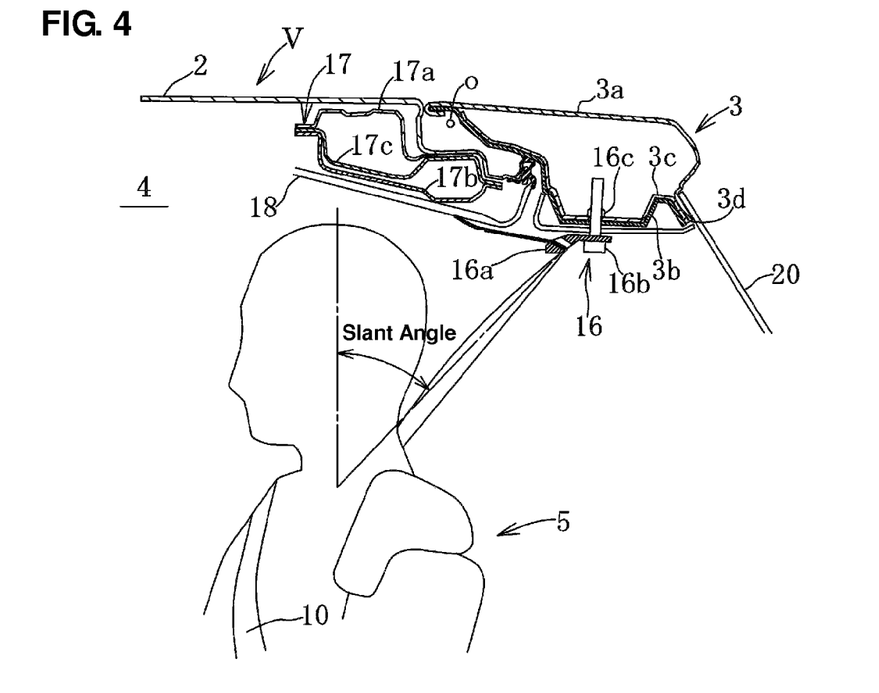
FIG. 4 is a sectional view taken along line IV-IV of FIG. 2.
Figure 5:
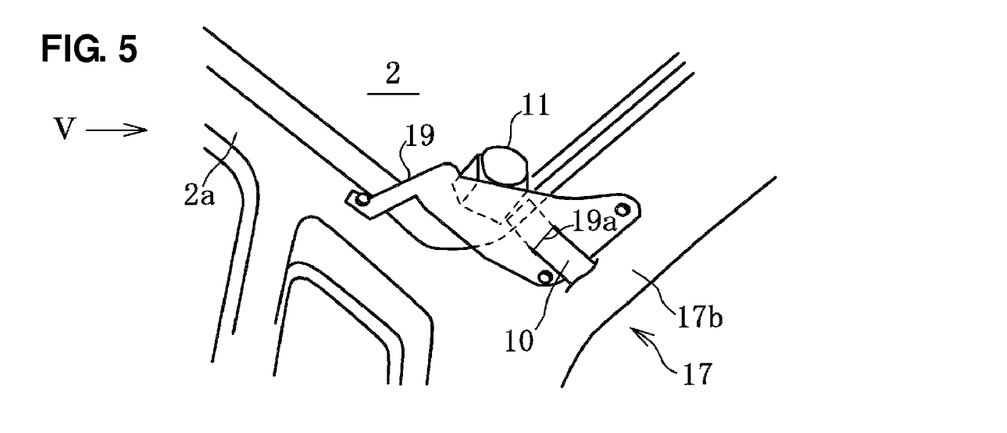
FIG. 5 is a perspective view of an attaching area of a retractor according to the first embodiment.
Figure 6:
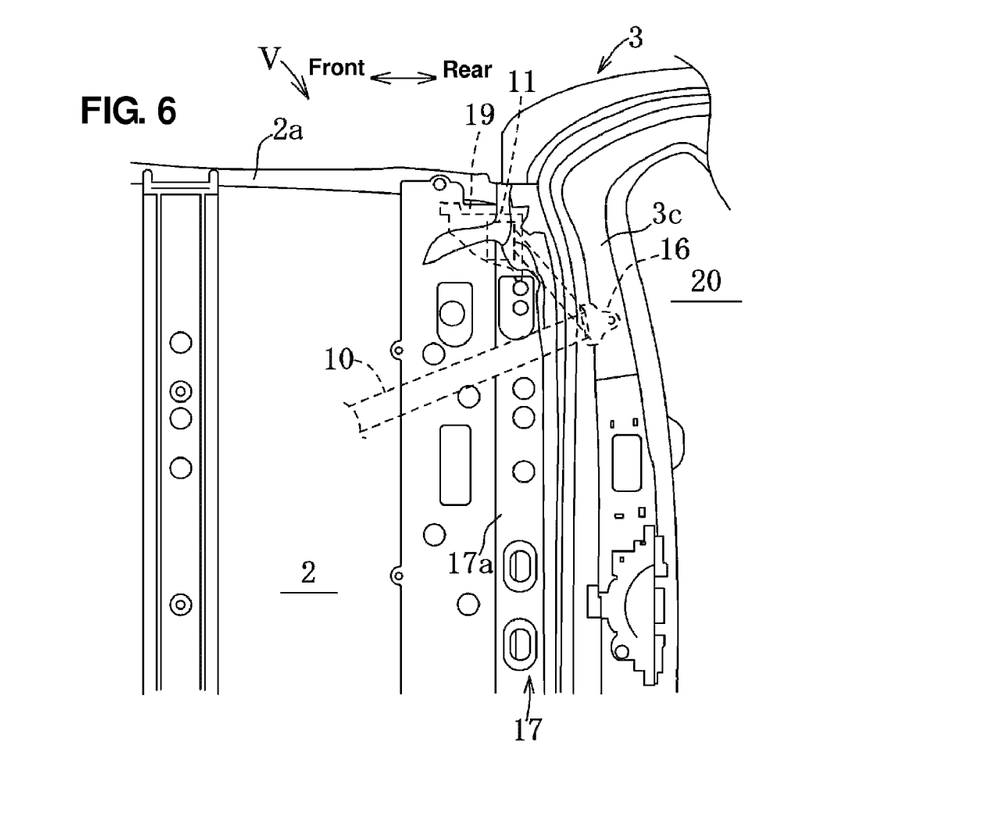
FIG. 6 is a view of a vehicle rear area, when viewed from a vehicle outside, according to the first embodiment.
Figure 7:
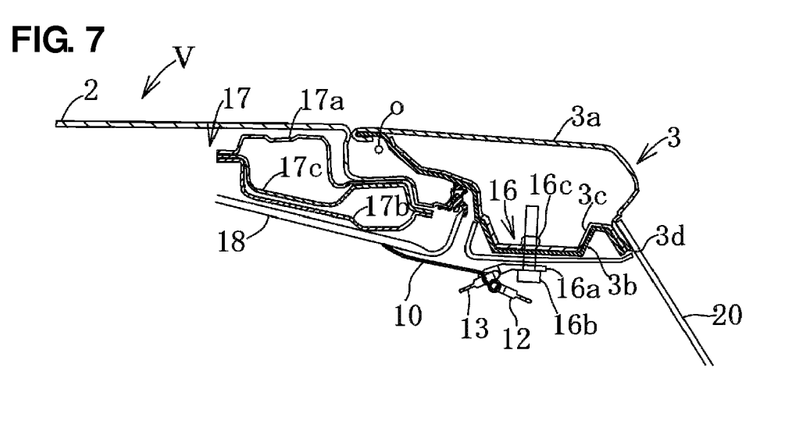
FIG. 7 is a sectional view when a seatbelt is not applied according to the first embodiment, which corresponds to FIG. 4.

The seatbelt device 9 of the first embodiment will be described specifically referring to FIGS. 3 through 7. FIG. 3 is a sectional view taken along line III-III of FIG. 2. FIG. 4 is a sectional view taken along line IV-IV of FIG. 2. FIG. 5 is a perspective view of an attaching area of the retractor 11. FIG. 6 is a view of a rear area of the vehicle V, when viewed from a vehicle outside. FIG. 7 is a sectional view when the seatbelt device 9 is not applied, which corresponds to FIG. 4.

First, the attaching structure of the retractor 11 will be described. A rear header 17 having a closed cross section, which is formed by a rear header outer 17a and a rear header inner 17b which extend in the vehicle width direction, and a first reinforcement 17c which is provided between these members 17a, 17b, is arranged at a rear edge portion of the roof 2. The seat 5 of the first embodiment is disposed near the rear header 17, when viewed in the vehicle longitudinal direction, in particular, in such a manner that the seat cushion 6 overlaps with the rear header 17 partially in the vehicle longitudinal direction.

A pair of roof rails 2a which has a closed cross section is disposed at the both ends of the roof 2. That is, the roof 2a comprises the pair of roof rails 2, the rear header 17 and a front header, not illustrated. Herein, the inside of the roof rails 2a and the rear header 17, namely a lower face of the vehicle body, is covered with a trim 18.

The retractor 11, which is an emergency type of seatbelt retractor (ELR), is fixed to a right-rear end area of the roof 2 via a gusset 19 as shown in FIG. 5. Herein, ELR is known, so its detailed description is omitted here. The gusset 19 is of substantially triangle shape, and its rear end portion is fixed to the rear header inner 17b at two points and its right portion is fixed to the roof rail 2a at a single point by means of bolts, respectively.

The retractor 11 is fixed to the gusset 19 by bolts, not illustrated, facing to the roof 2 so that its axis can extend in the vehicle width direction. The belt body 10 is configured to be wound up by the retractor 11 or withdrawn from the retractor 11 into the vehicle compartment 4, extending through a slit-shaped opening 19a which is formed at the gusset 19.

Next, the attaching structure of the belt anchor 16 will be descried. The lift gate 3 comprises a lift gate outer 3a, a lift gate inner 3b, a second reinforcement 3c which is arranged between these members 3a, 3b, and a window opening 3d which is arranged at the rear window 20. A closed cross section which is formed by the lift gate outer 3a and the lift gate inner 3b so as to extend in the vehicle width direction is formed at an upper area of the window opening 3d, and a second reinforcement 3c is formed inside this closed cross section.

The lift gate 3 is pivotally supported at pivot axes 0 of hinges 21 which are provided at both-side rear edge portions of the roof 2. One end of the hinge 21 is fixed to the roof 2 via the rear header outer 17a and the first reinforcement 17c by bolts, and the other end of the hinge 21 is fixed to the lift gate 3 via the lift gate inner 3b and the second reinforcement 3c by bolts. Herein, the second reinforcement 3c is a reinforcing member to reinforce the attaching portion of the hinge 21.

The belt anchor 16 comprises an anchor portion 16a which changes the extending direction of the belt body 10 toward the vehicle front, a bolt 16b which supports the anchor portion 16a, and a nut 16c which fastens the bolt 16b. As shown in FIGS. 2 and 6, the belt anchor 16 is disposed between the retractor 11 and the center seat of the seat 5 at a position which is offset from the center of the vehicle in the vehicle width direction. Thereby, when the first tongue 12 engages with the first buckle 14 and then the second tongue 13 engages with the second buckle 15, the belt body 10 extends from the right-rear side of the passenger to the left-lower side of the passenger, having the properly-large slant angle. Thereby, this seatbelt does not become any obstacle to the passenger, so that the function of the three-point type of seatbelt can be performed.

As shown in FIG. 4, the anchor portion 16a is fixed to the lift gate inner 3b and the second reinforcement 3c at the position between the hinge pivotal axis O and the window opening 3d. According to this structure, even in case the retractor 11 is arranged at the position which is just above the seated passenger and in front of the seat 5, the anchor point of the belt body 10 can be positioned rearward enough relative to the position of the seated passenger, and the support of the anchor point can be reinforced by fixing to the lift gate inner 3b and the second reinforcement 3c.

Further, since the belt anchor 16 is arranged at the high area above the window opening 3d, the belt body 10 which extends from the retractor 11 to the belt anchor 16 can be arranged near the roof 2 having the shortest length thereof, thereby providing the passenger with a proper rear view.

As shown in FIG. 7, the belt body 10 of the seatbelt device 9 has been wound up into the retractor when the seatbelt device is not applied. Accordingly, the concentrated arrangement of the first and second tongues 12, 13 can be provided.

Hereinafter, the operation and advantage of the seatbelt device 9 according to the first embodiment will be described. Since the belt anchor 16 is arranged at the lift gate 3 at the rear end portion of the vehicle V, the firm support of the belt anchor 6 can be provided. Further, since the anchor point of the belt body 10 is surely positioned in back of the seated passenger, as shown in FIG. 4, the slant angle of the belt body 10 relative to the vertical direction, when viewed from the vehicle side, can be properly large enough to protect the passenger properly, regardless of the positions of the retractor 11 and the seat 5. Accordingly, the seatbelt device 9 can absorb the crash impact properly.

Further, since the retractor 11 is provided at the roof 2, the seatbelt device 9 which can ensure the properly-large slant angle with the anchor point located in back of the passenger can be provided even in case the retractor 11 is not arranged at the lift gate 3.

Moreover, since the belt anchor 16 is arranged near the pivotal axis O of the hinge 21 in the vehicle longitudinal direction, the passenger can be restrained properly from having an uncomfortable feeling like being pulled by the belt body 10 when the lift gate 3 is opened.

Further, since the belt anchor 16 is arranged at the position of the lift gate 3 which is located above the rear window 20, the proper rear view can be provided.

Embodiment 2

A second embodiment will be described referring to FIGS. 8 through 14. Herein, the same components as those of the first embodiment are denoted by the same reference characters. The difference from the first embodiment is such that while the retractor 11 is arranged at the roof 2 in the first embodiment, the retractor 11 is arranged at the lift gate 3 and the anchor point is configured to be movable in the vehicle width direction in the second embodiment.

Figure 8:
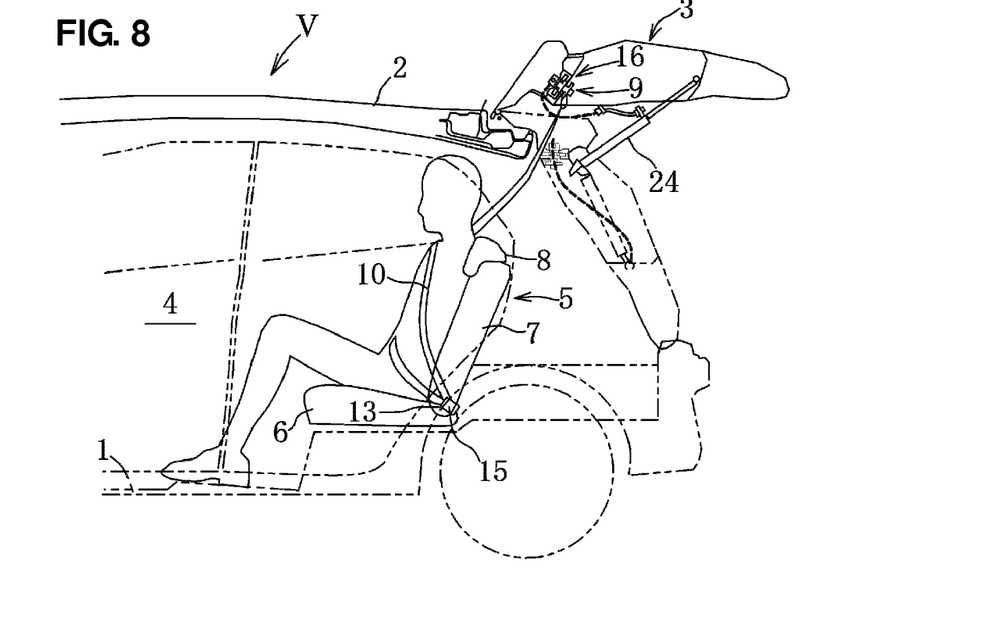
FIG. 8 is a side view of a vehicle showing a second embodiment of the present invention.
Figure 9:
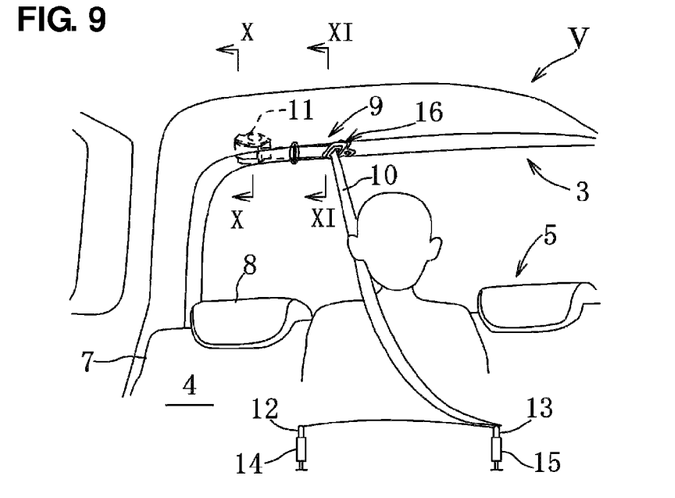
FIG. 9 is an elevation view of FIG. 8.

As shown in FIGS. 8 and 9, the vehicle V has the vehicle compartment 4 which is formed by the floor panel 1, the roof 2, the lift gate 3, and the right and left side frames and side doors, not illustrated. The seat 5 which is arranged on the floor panel 1 is disposed in back of the front-row seat which comprises the driver's seat and the passenger seat, not illustrated, and constitutes the rearmost-row seat in the vehicle compartment 4.

The seat 5 comprises the seat cushion 6, the seatback 7, and the headrest 8 which is detachably attached to the seatback 7.

This seat 5 is the bench type of seat which comprises three seats, the center seat, the left seat and the right seat, for three passengers to be seated.

The seatbelt device 9 for the passenger seated in the center seat of the seat 5 is the three-point type of seatbelt deice which comprises the belt body 10 which restrains the passenger seated, the retractor 11 which stores the belt body 10 therein, the first tongue 12 which is arranged at the tip of the belt body 10, the second tongue 13 which is arranged so as to move (slide) along the belt body 10, the first buckle 14 which is fixed on the right side of the passenger so as to engage with the first tongue 12, the second buckle 15 which is fixed on the left side of the passenger so as to engage with the second tongue 12, the belt anchor 16 which changes the extending direction of the belt body 10 which is withdrawn from the retractor 11 arranged at the lift gate 3 toward the vehicle front, and a moving means 22 which moves the belt anchor 16 in the vehicle width direction in accordance with an opening-closing move of the lift gate 3.

Figure 10:
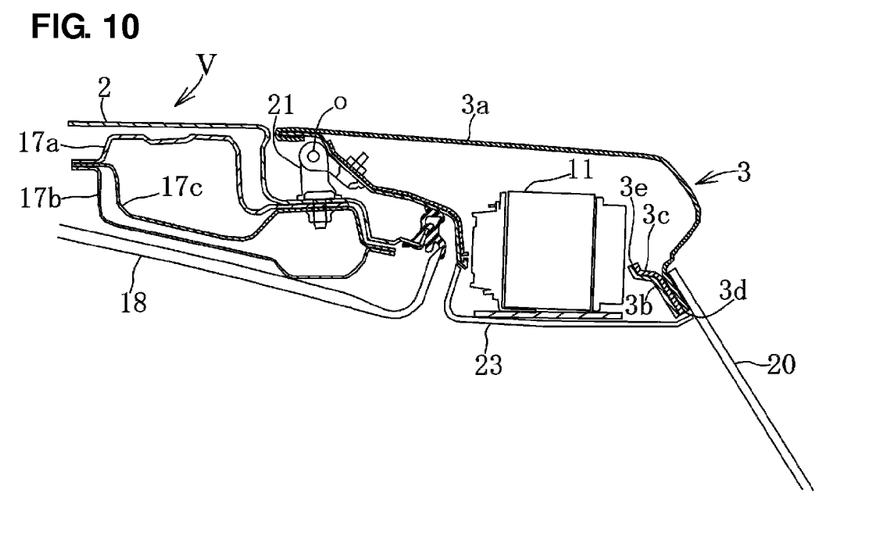
FIG. 10 is a sectional view taken along line X-X of FIG. 9.
Figure 11:
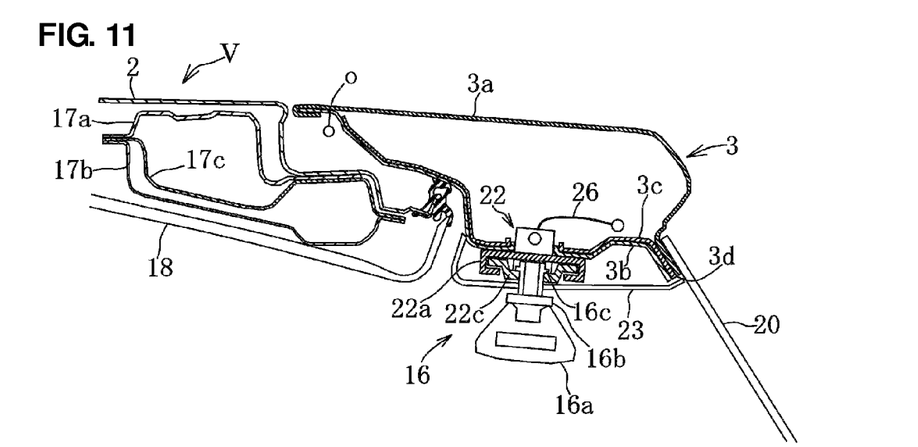
FIG. 11 is a sectional view taken along line XI-XI of FIG. 9.
Figure 12:
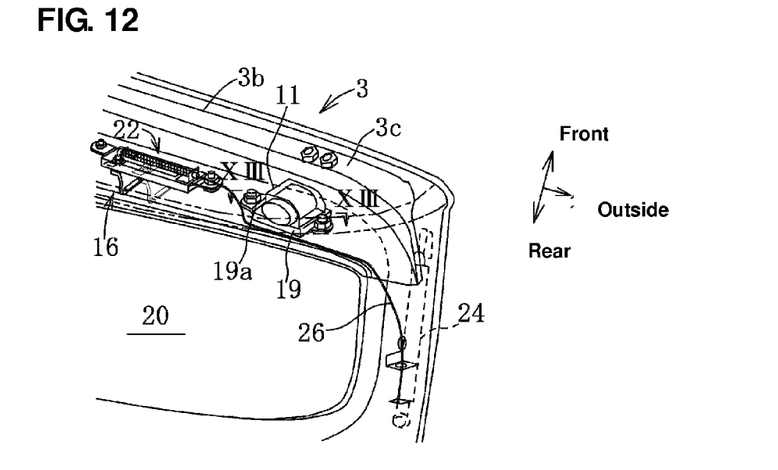
FIG. 12 is a view of the inside of a lift gate according to the second embodiment, when viewed from a vehicle rear.
Figure 13:
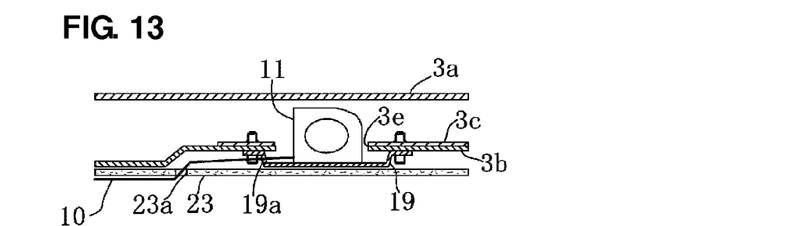
FIG. 13 is a sectional view taken along line XIII-XIII of FIG. 12.
Figure 14:
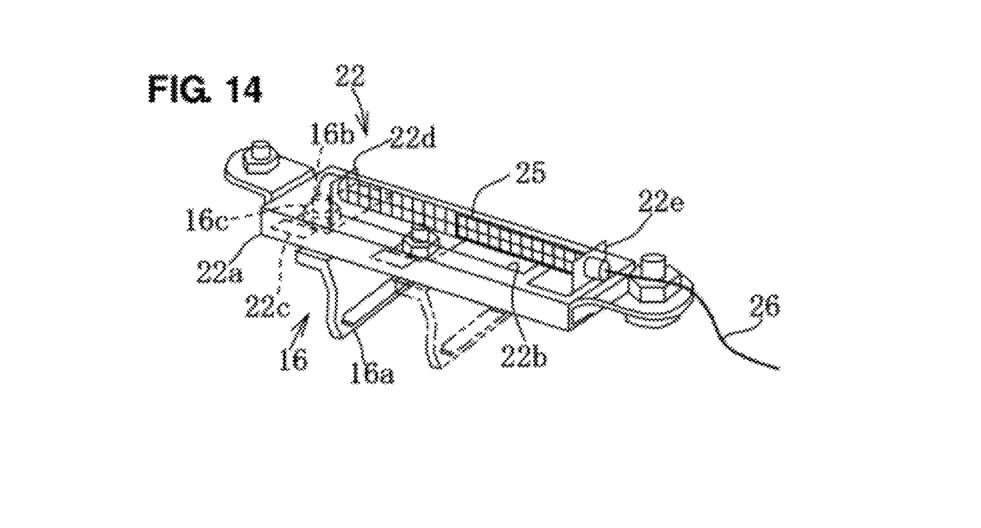
FIG. 14 is a perspective view of a moving means according to the second embodiment.

The seatbelt device 9 of the second embodiment will be described specifically referring to FIGS. 10 through 14. FIG. 10 is a sectional view taken along line X-X of FIG. 9. FIG. 11 is a sectional view taken along line XI-XI of FIG. 9. FIG. 12 is a view of the inside of the lift gate, when viewed from the vehicle rear. FIG. 13 is a sectional view taken along line XIII-XIII of FIG. 12. FIG. 14 is a perspective view of the moving means 22.

First, the attaching structure of the retractor 11 will be described. The lift gate 3 comprises the lift gate outer 3a, the lift gate inner 3b, the second reinforcement 3c which is arranged between these members 3a, 3b, the window opening 3d which is arranged at the rear window 20, an inner trim 23 which is arranged at the inner face of the lift gate inner 3b, and a damper 24 which reduces the opening/closing speed of the lift gate 3.

The closed cross section which is formed by the lift gate outer 3a and the lift gate inner 3b so as to extend in the vehicle width direction is formed at the upper area of the window opening 3d, and the second reinforcement 3c is formed inside this closed cross section.

The lift gate 3 is pivotally supported at the pivot axes 0 of hinges 21 which are provided at the both-side rear edge portions of the roof 2. One end of the hinge 21 is fixed to the roof 2 via the rear header outer 17a and the first reinforcement 17c by bolts, and the other end of the hinge 21 is fixed to the lift gate 3 via the lift gate inner 3b and the second reinforcement 3c by bolts.

As shown in FIGS. 12 and 13, the retractor 11 which is arranged at the retractor opening 3e is fixed to the lift gate inner 3b and the second reinforcement 3c by bolts via the gusset 19. Herein, the second reinforcement 3c is the reinforcing member to reinforce the attaching portion of the hinge 21.

The retractor 11 is fixed to the gusset 19 by bolts, not illustrated and arranged facing to the lift gate 3a with its axis extending in the vehicle longitudinal direction. The belt body 10 is configured to be withdrawn into the vehicle compartment 4 or wound up, extending through the slit-shaped opening 19a of the gusset 19 and a slit-shaped opening 24a of the inner trim 23.

Further, since the retractor 11 is stored inside the closed cross section formed by the lift gate outer 3a and the lift gate inner 3b, it may not be necessary that any other particular space for arranging the retractor 11 is provided in the vehicle compartment 4. Moreover, since the retractor 11 is arranged at the area above the window opening 3d, the belt body 10 which extends from the opening 19a to the belt anchor 16 can be arranged near the upper portion of the lift gate 3 having the shortest length thereof, thereby providing the passenger with the proper rear view.

Next, the attaching structure of the belt anchor 16 will be descried. The belt anchor 16 comprises the anchor portion 16a which changes the extending direction of the belt body 10 toward the vehicle front, the bolt 16b which penetrates the anchor portion 16a, and the nut 16c which fastens the bolt 16b.

As shown in FIG. 14, the moving means 22 to which the belt anchor 16 is fixed comprises a C-shaped casing 22a, a groove 22b which opens in a longitudinal direction of the casing 22a, a slider 22c which is stored in and guided by the casing 22a so as to slide, a wall portion 22d which rises at one end of the groove 22b, a wall portion 22e which rises at the other end of the groove 22b, a spring 25 which is arranged between the wall portions 22d, 22e and has a biasing force toward the wall portion 22d, and a wire member 26 which has one end thereof connecting to the wall portion 22d of the spring 25 and the slider 22c and the other end thereof connecting to an outer cylinder of the damper 24.

The anchor portion 16a is fixed to the slider 22c via the bolt 16d and the nut 16c, and connects to the one end of the wire member 26 via the slider 22c. The moving means 22 to which the belt anchor 16 is fixed to the lift gate inner 3b and the second reinforcement 3c by bolts at a position between the retractor 11 and the center seat of the seat 5 which is offset from the center of the vehicle in the vehicle width direction. The wall portion 22d of the moving means 22 is located on the side of the center in the vehicle width direction.

Thus, the anchor portion 16a is always biased to the one end of the groove 22b on the side of the wall portion 22d, that is, toward the center in the vehicle width direction, by the biasing force of the spring 25. When the lift gate 3 is open, the relative position between the damper 24 and the moving means 22 changes according to the opening move of the lift gate 3 so that the distance between them can expands.

Since the distance between the damper 24 and the moving means 22 expands and thereby the wire member 26 is pulled, the spring 25 is compressed toward the wall portion 22e. Accordingly, the slider 22c slides toward the wall portion 22e, that is, the anchor portion 16a moves toward the retractor 11. When the lift gate 3 is closed, the compressing of the spring 25 is released and thereby the pulling of the wire member 26 is also released, the anchor portion 16a returns to its original center position in the vehicle width direction.

That is, in case the seatbelt is applied and the lift gate 3 is closed, when the first tongue 12 engages with the first buckle 14 and then the second tongue 13 engages with the second buckle 15, the belt body 10 extends from the right-rear side of the passenger to the left-lower side of the passenger, having the properly-large slant angle. Thereby, this seatbelt may not be any obstacle to the passenger, so that the function of the three-point type of seatbelt can be performed. Meanwhile, when the seatbelt is applied and the lift gate 3 is opened, since the anchor portion 16a moves toward the vehicle outside, namely toward the first tongue 12, according to the opening move of the lift gate 3, the passenger can be restrained properly from having the uncomfortable feeling like being pulled by the belt body 10.

Hereinafter, the operation and advantage of the seatbelt device 9 according to the second embodiment will be described. Since the belt anchor 16 is arranged at the lift gate 3 at the rear end portion of the vehicle V, the firm support of the belt anchor 6 can be provided. Further, since the anchor point of the belt body 10 is surely positioned in back of the seated passenger, the slant angle of the belt body 10 relative to the vertical direction, when viewed from the vehicle side, can be properly large enough to protect the passenger properly, regardless of the positions of the retractor 11 and the seat 5. Accordingly, the seatbelt device 9 can absorb the crash impact properly.

Since the retractor 11 is provided inside the closed cross section of the lift gate 3, the seatbelt device 9 which can ensure the properly-large slant angle with the anchor point located in back of the passenger can be provided even in case the retractor 11 is not arranged at the roof 2. Further, since the retractor 11 is fixed to the second reinforcement 3c which reinforces the attaching portion of the hinge 21 to the lift gate 3, the support strength of the retractor 11 can be increased without increasing the number of parts. Moreover, the head clearance of the passenger can be ensured, thereby providing the passenger with the appropriate sitting position.

Since there is provided the moving means 22 which moves the belt anchor 16 in the vehicle width direction in accordance with the opening-closing move of the lift gate 3, the passenger can be restrained properly from having the uncomfortable feeling like being pulled by the belt body 10 when the lift gate 3 is opened.

The present invention should not be limited to the above-descried embodiments, and any other modifications and improvements may be applied within the scope of a sprit of the present invention.

For example, while the emergency type of seatbelt retractor (ELR) is described in the above-described embodiments, any other type of retractor, such as an automatic seatbelt retractor (ALR) may be used. While the minivan type of vehicle is described in the above-described embodiments, any other type of vehicle, such as a hutch back type of vehicle, may be applied as long as it has any vehicle constituting member which is arranged in back of the rear header and firm enough to support the belt anchor. While the example in which the belt anchor is arranged to be offset to the right and the belt body extends from the right-rear side of the passenger to the left-lower side of the passenger, having the properly-large slant angle is described in the above-described embodiments, the belt anchor may be arranged to be offset to the left. In this case, the first tongue engages with the second buckle and then the second tongue engages with the first buckle, so that the belt body extends from the left-rear side of the passenger to the right-lower side of the passenger.

What is claimed is:

1. A seatbelt device of a vehicle which comprises a rear header provided at a rear edge portion of a roof, a rear seat arranged near the rear header, and a lift gate arranged in back of the rear seat, comprising:
    a belt body to restrain a passenger seated in the rear seat;
    a retractor to store said belt body; and
    a belt anchor to change an extending direction of said belt body which is withdrawn from said retractor toward a vehicle front,
    wherein said retractor is provided in the roof and said belt anchor is arranged on the lift gate.

2. The seatbelt device of a vehicle of claim 1, wherein said belt anchor is arranged at a position on the lift gate, wherein the anchor is located above a rear window fixed to the lift gate.

3. The seatbelt device of a vehicle of claim 1, wherein the vehicle further comprises a hinge which is provided at the rear header to pivotally support the lift gate, and said belt anchor is arranged near a pivotal axis of the hinge in a vehicle longitudinal direction.

4. The seatbelt device of a vehicle of claim 1, wherein the rear seat has a center seat at a central portion thereof so as to have plural passengers seated therein, and said belt body is provided so as to restrain the passenger seated in the center seat of the rear seat.

5. The seatbelt device of a vehicle of claim 1, wherein said belt body comprises a tongue for anchoring which is arranged at a tip thereof and a tongue for passenger restraint which is arranged so as to move along the belt body, and there is provided a buckle for passenger restraint which is arranged on one side of the passenger seated so as to engage with the tongue for passenger restraint and a buckle for anchoring which is arranged on the other side of the passenger seated so as to engage with the tongue for anchor.

* * * * *